Feb. 12, 1924. 1,483,660
T. GRUBB
EGG CANDLING DEVICE
Filed May 24, 1922 4 Sheets-Sheet 1
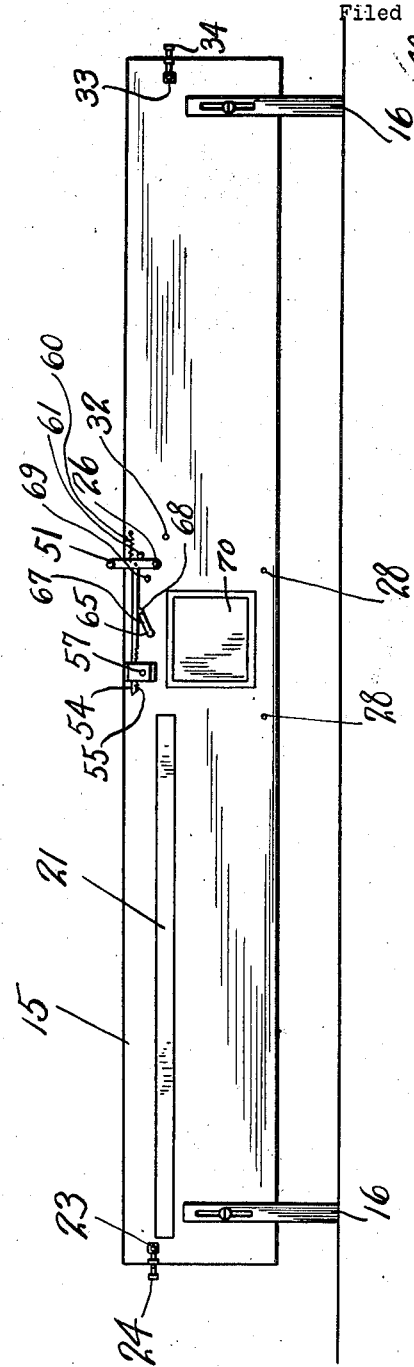
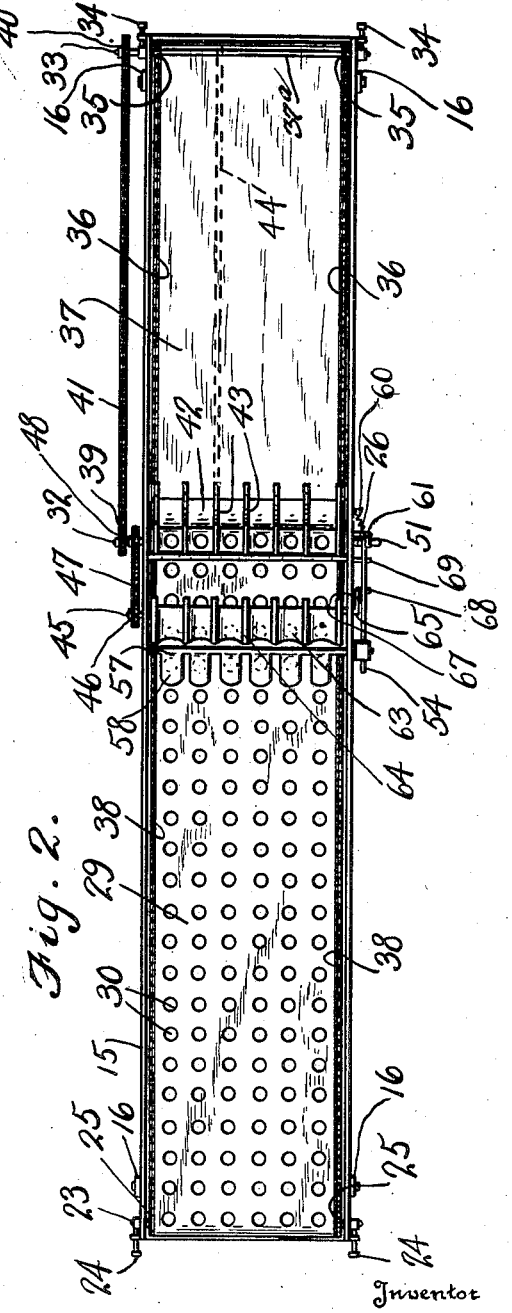
Witnesses
L. B. James
Inventor
T. Grubb
By Victor J. Evans
Attorney

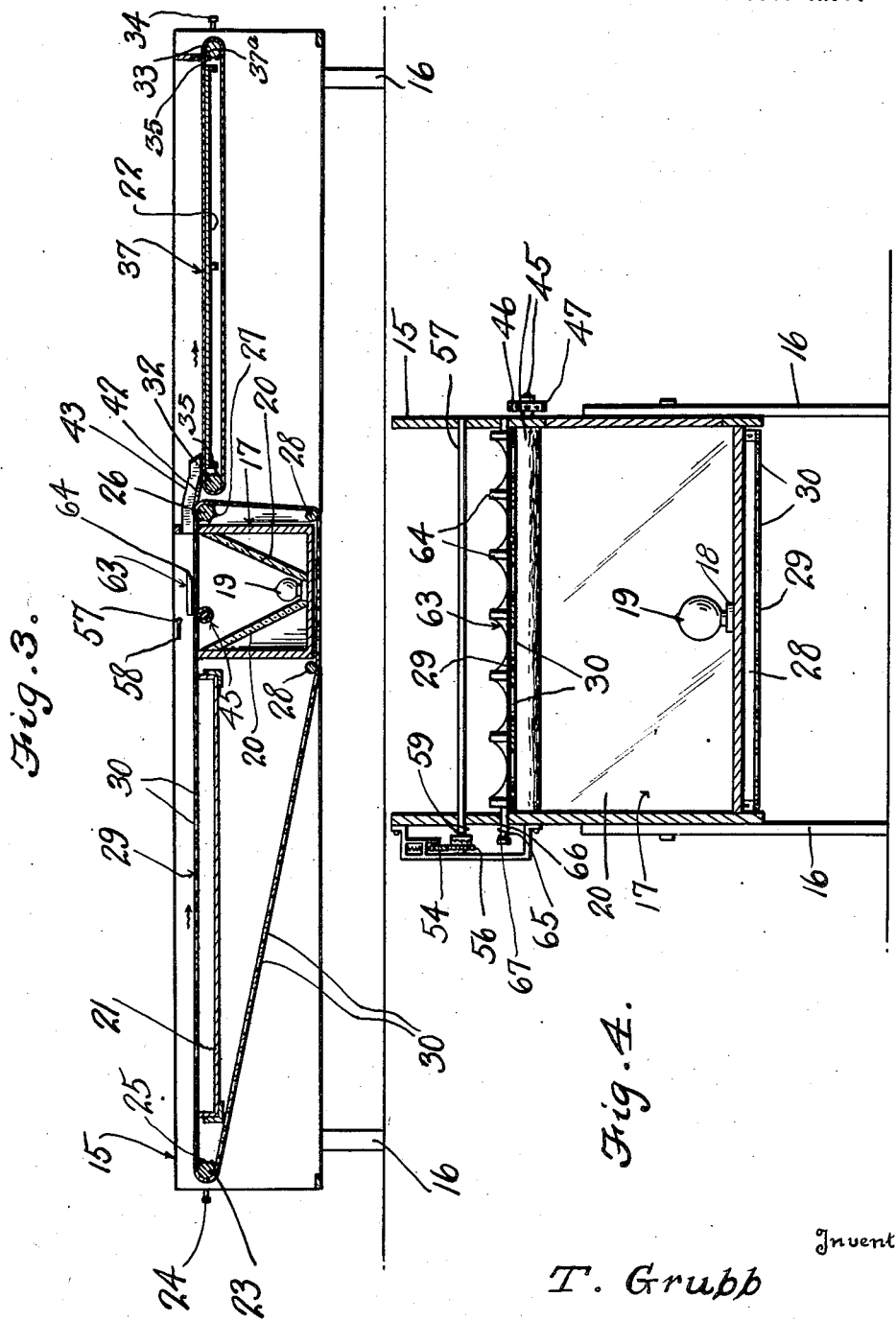

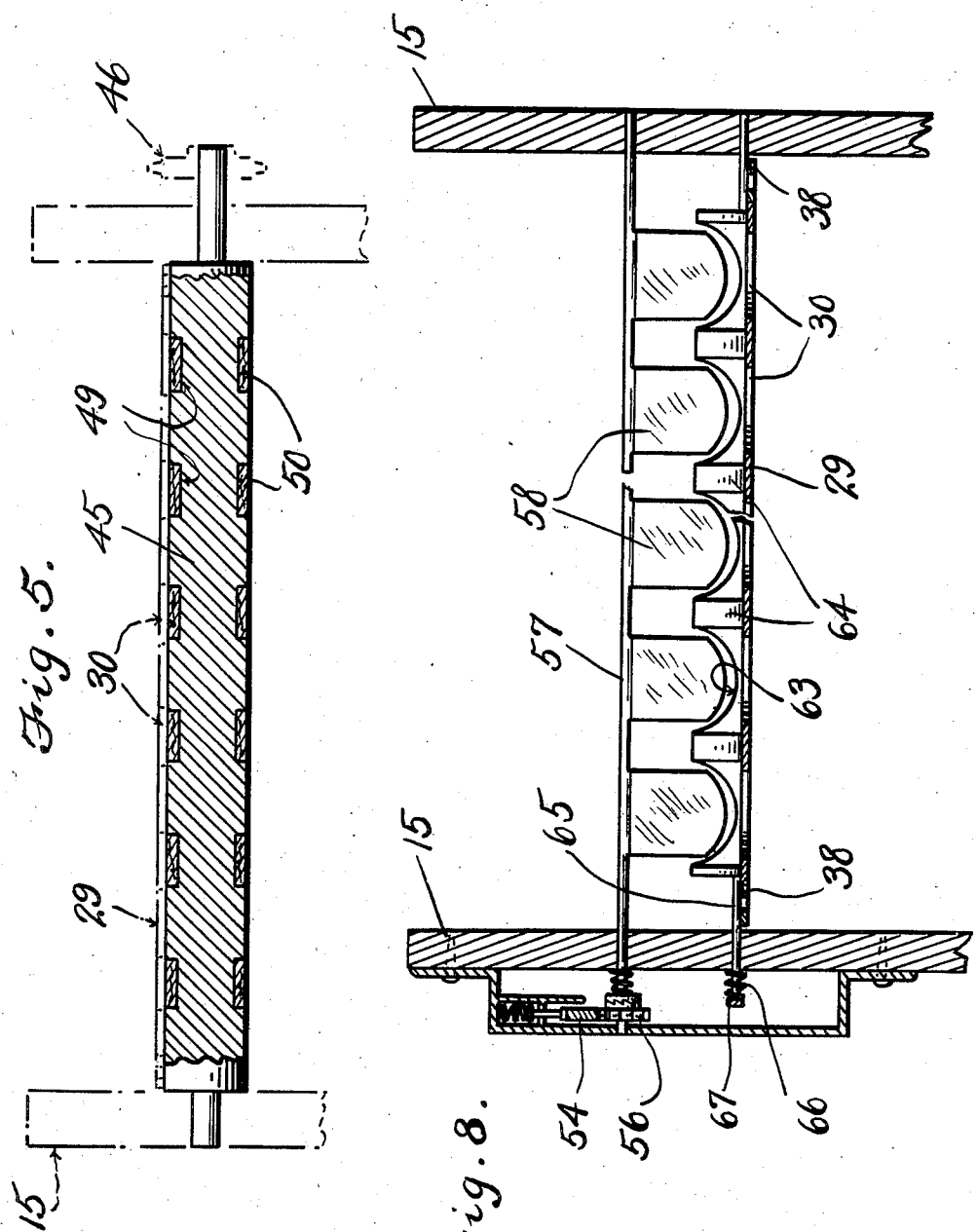

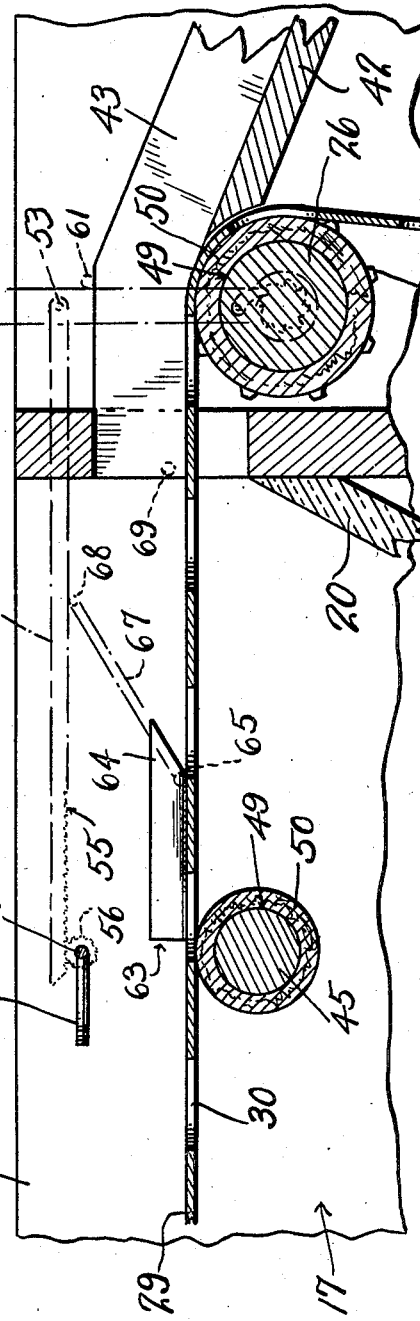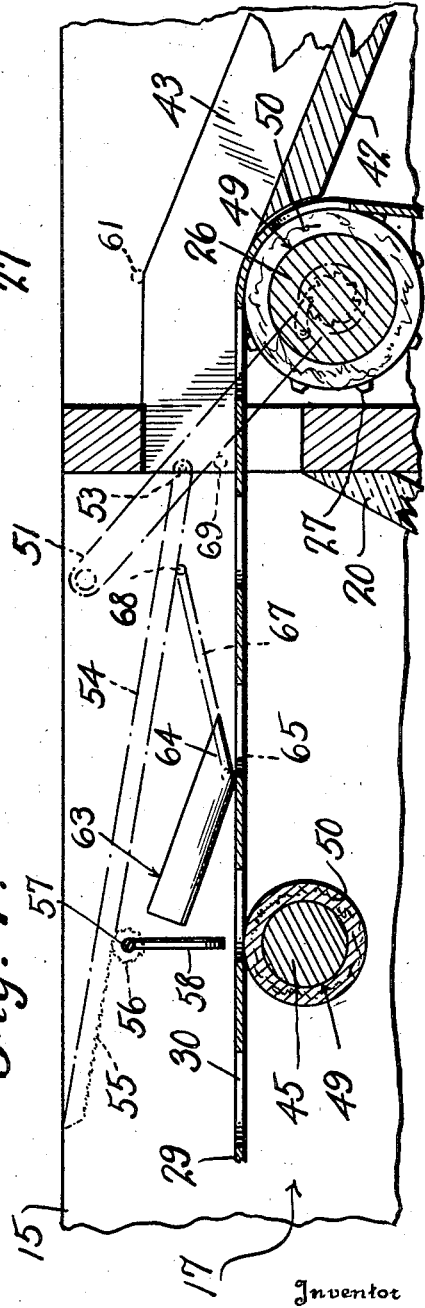

Patented Feb. 12, 1924.                                              1,483,660

UNITED STATES PATENT OFFICE.

THOMAS GRUBB, OF ST. LOUIS, MISSOURI.

EGG-CANDLING DEVICE.

Application filed May 24, 1922. Serial No. 563,359.

*To all whom it may concern:*

Be it known that I, THOMAS GRUBB, a citizen of the United States, residing at St. Louis, in the county of St. Louis City and State of Missouri, have invented new and useful Improvements in Egg-Candling Devices, of which the following is a specification.

This invention relates to testing devices, particularly to devices for testing or candling eggs, and has for it object the provision of a device for this purpose which will efficiently operate to permit the testing of a large number of eggs in a very short time and remarkably little effort, the device being primarily a time and labor saver particularly adapted for use in commission houses, storage warehouses and the like where eggs are handled in large quantities.

An important and more specific object is the provision of a device of this character which includes means for causing a travelling apron or belt to pass continuously over a source of light, the belt or apron being provided with holes within which the eggs to be tested are placed, these holes permitting the passage of the light through the eggs so that when the operator views the eggs looking through them toward the light will readily ascertain whether or not the eggs are in proper condition for marketing.

A very important object is the provision of a device of this character which is provided with means under manual control of the operator for turning the eggs during inspection thereof so that they may be viewed from both sides or both ends.

Still another object is the provision of a device of this character which will automatically operate to place the eggs within a suitable receptacle after they are tested without it being necessary for them to be handled.

Still another object is the provision of a device of this character which is so constructed that different grades of eggs may be tested and be kept separate after such testing.

Yet another object is the provision of a testing device of this character in which is provided a drawer or receptacle located beneath the travelling belt for the purpose of catching and holding any eggs which are of too small size and which drop through the holes in the travelling apron.

An additional object is the provision of an egg candling device of this character which will be simple and inexpensive in manufacture, easy to operate, very rapid in action, efficient and positive in use and a general improvement in the art.

With the above and other objects and advantages in view, the invention consists in the details of construction to be hereinafter more fully described and claimed and illustrated in the accompanying drawings in which, Figure 1 is a side elevation of the device.
Figure 2 is a top plan view thereof.
Figure 3 is a longitudinal section.
Figure 4 is a cross-sectional view taken through the source of light.
Figure 5 is a cross-sectional view taken through one of the egg engaging rollers.
Figure 6 is an enlarged longitudinal sectional view taken through the portion of the device at which the light source is located and showing the egg turning mechanism at one limit of its movement.
Figure 7 is a similar view showing the egg turning device operated and at the other limit of its movement.
Figure 8 is a detail cross-sectional view taken through the turning mechanism.

Referring more particularly to the drawings I have shown my device as comprising an elongated rectangular casing 15 which is provided near its ends with vertically adjustable legs 16 by means of which the height of the casing may be varied with respect to the floor to suit the requirements of different operators. Located at the central portion of this casing is a compartment 17 within which is mounted a suitable electric light socket 18 having any ordinary or preferred feeding means therefor and carrying an incandescent bulb 19. Located within this compartment 17 at opposite sides thereof are inclined reflectors 20 which operate to throw the light upwardly. Located within one end portion of the casing, that is between the compartment 17 and the left end is a drawer 21 which is spaced downwardly somewhat from the top of the casing and which is for a purpose to be described. Similarly located within the other end portion of the casing, that is between the compartment 17 and the right hand end is a supporting shelf 22 the purpose of which will be hereinafter explained.

Journaled transversely of said first mentioned end of the casing near the upper corner thereof is a roller 23 which is provided with screw adjusting means indicated at 24 and which has its ends provided with sprockets 25. Journaled transversely of the casing near one upper edge of the compartment 17 is a similar roller 26 which likewise has its ends provided with sprockets 27. Journaled at the lower edges of the compartment 17 are idle rollers 28 which are not provided with sprockets and trained about the rollers 23, 26 and 28 is an endless apron or belt 29 which of course travels across the top of the compartment 17 and which is provided throughout its area with a plurality of longitudinal and transverse rows of holes 30. These holes 30 are designed to serve as a conveyor for eggs to be tested, the entire upper stretch of this conveyor or apron being filled with the eggs as it travels. It is preferable that this endless apron or belt be constructed of two plies of suitable material such as canvas or the like, the inner ply being preferably white and the other ply being preferably black so as to exclude the passage of light through the apron as it travels over the open top of compartment 17. This detail however is not of very great importance as it will be understood that I may have constructed a suitable apron or belt of any suitable material. It should be stated that one end of the shaft of the roller 26 projects beyond the side of the casing and carries a crank handle 31 by means of which it may be turned whereby to move the apron 29 carrying the eggs. It is to be noted that the upper stretch of the apron 29 passes above the drawer 21 so that any eggs placed within the holes 30 and of sufficiently small size to pass through these holes will drop to the drawer to receive attention later.

Journaled transversely of the casing at the other end portion thereof, that is at the ends of the shelf 22 are rollers 32 and 33, the latter of which has associated therewith a screw device 34 similar to the screw device 24. The ends of the rollers 32 and 33 carry sprockets 35 about which are trained chains 36 which are riveted or otherwise secured upon the edges of an imperforate apron 37. It should also be stated that the edges of the apron 29 are likewise provided with chains 38 which are engaged with the sprockets 25 and 27. The upper stretch of the apron 37 bears upon the top of the shelf 22 and it is preferable to provide an upright partition 37ª at the far end of the conveyor 37 for the purpose of preventing eggs from passing off from this conveyor accidentally.

In order that the receiving imperforate conveyor 37 may be driven, I provide sprockets 39 and 40 which are secured upon the projecting ends of the shafts of the rollers 26 and 33 respectively, and trained about the sprockets 39 and 40 is a drive chain 41.

Extending from the roller 26 over the roller 32 and onto the forward edge of the shelf 22 of course above the upper stretch of the conveyor 37 is a bridge plate 42 which is for the purpose of receiving the eggs discharged from the perforated conveyor 29 and conducting them onto the receiving conveyor 37 and it is preferable that this bridge 42 be formed with a plurality of partitions 43 which will prevent the eggs from jostling too hard with the possible danger of cracking. If preferred, I may provide a longitudinal partition 44 which extends the full length of the casing above the shelf 22 so that different grades of eggs tested by the device may be kept separate on the receiving conveyor.

It will be seen that when the crank 31 is turned the conveyor 29 will be moved and the conveyor 37 will move simultaneously therewith. Eggs placed within the holes 30 on the conveyor or apron 29 will of course be brought over the open top of the compartment 17 so that the operator may be able to glance through the eggs towards the source of light 19 and ascertain the condition in a well known manner. It is however highly advisable and in fact almost necessary that the eggs be viewed from both sides and in order to effect this I make use of the turning device illustrated which is located above the open top of the compartment 17. This turning device includes among other features, a transverse roller 45 which is journaled across the open top of the compartment 17 beneath the upper stretch of the apron 29 as clearly shown. This roller has the ends of its supporting shaft extending through the sides of the casing and one end carries a sprocket 46 about which is trained a chain 47 which is in turn trained about a sprocket 48 secured upon the projecting shaft of the roller 26 so that the roller 45 will be driven synchronously with the movement of the conveyors 29 and 37. This roller 45 and also the roller 26 are formed with peripheral grooves 49 the bottoms of which are packed with cotton fibre or the like indicated at 50, these grooves being positioned at such points as to be in line with the centers of the rows of holes 30 extending longitudinally of the conveyor. The purpose of the cotton packed grooves is to prevent injury to the eggs when they are brought into engagement with the rollers in the operation as will be explained.

The egg turning device further comprises an upstanding pivoted lever 51 which has its upper end serving as a handle engageable by the operator whereby the lever may be rocked back and forth. Pivotally connected with this lever as indicated at 53 is a rearwardly extending link 54 which has the lower edge of its free end portion provided with a plurality of rack teeth 55 which intermesh with the teeth of a gear 56 secured upon a shaft 57 which is journaled transversely of the casing. This shaft carries a blade or plate 58 which is normally disposed in a horizontal position and held in such position by means of a suitable spring 59. It is also preferable to provide a spring 60 which normally holds the operating lever 51 in its neutral or normal position in engagement with a suitable stop pin 61 or the like suitably mounted upon the casing. The plate 58 is designed to be brought to engagement with the eggs during the operation of the device and is preferably covered with padding whereby to cushion the force of the blow against the eggs and prevent cracking thereof. The turning device further includes a plurality of concaved or fork shaped members 63 which are all connected or formed in a single sheet of material and which are located immediately above the upper stretch of the apron 29 as clearly disclosed. This assembly of trough shaped members is pivoted transversely of the casing so as to have rocking movement and in actual practice all these trough shaped or concaved members are supported by a frame 64 mounted upon a shaft 65 which is journaled through the sides of the casing. A torsional spring 66 is provided at one end of this shaft 65 for the purpose of holding these members in their normal position ready to receive the eggs from the apron 29. Extending from the frame 64 is an inclined arm 67 which is provided at its end with a projection 68 disposed within the path of movement of the lever 51. The numeral 69 designates a stop pin which is engageable by the lever 51 for limiting its movement.

Assuming that the device has been constructed and assembled as above described, the operation is as follows:

When the operator turns the crank handle it is to be observed that the aprons 29 and 37 will be moved as above described. The eggs to be tested are placed within the holes 30 in the apron 29 and will be carried successively over the open top of the compartment 17 within which is disposed the source of light. It might be mentioned that access to this source of light for the purpose of changing bulbs or making adjustments may be had through a suitable door 70 in one side of the casing. When the eggs located within the holes 30 pass over the top of the light compartment the operator will glance through the eggs and readily ascertain whether they are in a suitable condition for marketing or not. When the eggs reach the roller 45 they will engage thereagainst and this will operate to lift the eggs out of the holes 30. At the same time the operator pulls back upon the lever 51 whereupon the first action is that the rack meshing with the gear 56 will operate to turn the shaft 57 which carries the plate 58 and these plates will engage behind the eggs which have been lifted from the holes by engagement with the roller 45 and shoved these eggs onto or into the concave or trough shaped members 63. Continued rearward movement of the lever 51 will cause it to engage against the projection 68 and this will result in downward swinging movement of the arm 67 and consequent pivotal movement of all the trough shaped members 63 so that they will be tilted and this will operate to cause the eggs to slide or roll along the trough shaped members until the eggs pass off therefrom and drop into the series of holes 30 from which they have been previously lifted by the action of the roll 45. By this means it will be seen that the eggs are completely turned or inverted so that the operator may look through them again but from the opposite side this time and thus make sure that they are in proper condition for sale. After passing this turning mechanism the eggs are carried by the apron 29 until they engage against the roller 26 whereupon they will be again lifted out of the holes 30. When the roller 26 operates to lift the eggs out of the holes 30 the eggs will pass onto the bridge member 42 and will roll thereover to the conveyor 37 from which they will be subsequently removed and placed within packing cases or crates. The action of the turning device is entierly under the control of the operator and it is of course necessary that the lever 51 be swung back and forth as the various rows of eggs are lifted by the roller 45. The entire operation is of course continuous as long as eggs are placed upon the apron 29 and the mechanism operated by the crank handle disclosed or by any suitable power device which I may find advisable to incorporate with the device for the purpose of effecting the drive.

From the foregoing description and a study of the drawings it will be apparent that I have thus provided a simply constructed and very easily operated device by means of which large quantities of eggs may be handled or tested in a remarkably short time and with very little effort on the part of the operator. The device is particularly advantageous for use in cold storage plants, commission houses, large henneries or other places where eggs in great quantities are handled. The device thus operates as a great time and labor saver and consequently will be economical in every way. Owing to the padding of certain of the parts and the fact that the conveyors are of flexible material it will be apparent that the eggs should be run through the machine without any great danger of cracking or chipping them as to render them unsaleable. It is of course to be observed that a high candle power lamp may be used as the source of light so that a very powerful light action will be had which will enable the operator to do the testing even in the day time or without the device being placed within a dark room in a very efficient and rapid manner. Owing to the simplicity of the construction and the fewness of the parts it is apparent that there is nothing to get out of order and that the device should consequently have a long life and satisfactorily perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. In a device of the character described having an elongated casing provided intermediate its ends with a compartment having an open top and within which is located a source of light, an endless apron travelling throughout one end portion of the casing and extending over the top of said light compartment, said apron being provided with a plurality of holes constituting seats within which eggs are disposed, a receiving conveyor operating within the other end portion of the casing, means for simultaneously driving both of said conveyors, the combination of means located at the top portion of said light compartment whereby to turn the eggs, said means comprising a roller journaled beneath the first named apron for lifting the eggs from the holes, a plurality of trough like members pivoted within the casing above the first named apron and receiving the eggs lifted from the holes by said roller, and means for rocking said trough like members to reconduct the eggs in inverted position to the holes.

2. In a device of the character described having an elongated casing provided intermediate its ends with a compartment having an open top and within which is located a source of light, an endless apron travelling throughout one end portion of the casing and extending over the top of said light compartment, said apron being provided with a plurality of holes constituting seats within which eggs are disposed, a receiving conveyor operating within the other end portion of the casing, means for simultaneously driving both of said conveyors, the combination of means located at the top portion of said light compartment whereby to turn the eggs, said means comprising a roller journaled beneath the first named apron for lifting the eggs from the holes, a plurality of trough like members pivoted within the casing above the first named apron and receiving the eggs lifted from the holes by said roller, and means for rocking said trough like members to reconduct the eggs in inverted position to the holes, said means consisting of a manually movable lever, an arm associated with all of the trough shaped members and engageable by said lever whereby to tilt the trough shaped members, and means operated by such movement of said arm whereby to force the eggs from the first named apron onto said trough shaped members.

3. In a device of the character described having an elongated casing provided intermediate its ends with a compartment having an open top and within which is located a source of light, an endless apron travelling throughout one end portion of the casing and extending over the top of said light compartment, said apron being provided with a plurality of holes constituting seats within which eggs are disposed, a receiving conveyor operating within the other end portion of the casing, means for simultaneously driving both of said conveyors, the combination of means located at the top portion of said light compartment whereby to turn the eggs, said means comprising a roller journaled beneath the first named apron for lifting the eggs from the holes, a plurality of trough like members pivoted within the casing above the first named apron and receiving the eggs lifted from the holes by said roller, and means for rocking said trough like members to reconduct the eggs in inverted position to the holes, said means consisting of a manually movable lever, an arm associated with all of the trough shaped members and engageable by said lever whereby to tilt the trough shaped members, and means operated by such movement of said arm whereby to force the eggs from the first named apron onto said trough shaped members, said means consisting of a longitudinal link formed with a rack, a transverse shaft carrying a pinion meshing with said rack, and a plurality of plates carried by said shaft and movable downwardly and forwardly by movement thereof into engagement with the eggs in alignment with said trough shaped members.

4. An egg testing device having an elongated casing provided centrally with a compartment containing a source of light, an endless apron travelling through one end portion of the casing and above the top of said compartment, said apron being provided with rows of holes constituting seats for eggs, a receiving imperforate conveyor movable along the other end portion of the casing, means for simultaneously driving said apron and said conveyor, a bridge plate extending from the discharge end of said perforated apron onto the receiving end of the imperforate conveyor, the combination of of a plurality of trough members pivoted within the casing above said compartment, means for lifting the eggs from said holes, means for forcing said lifted eggs onto said trough members, and means for tilting said trough members.

In testimony whereof I affix my signature.

THOMAS GRUBB.